(12) United States Patent
Nakayama et al.

(10) Patent No.: US 7,050,104 B1
(45) Date of Patent: May 23, 2006

(54) IMAGE SENSING APPARATUS

(75) Inventors: Satoshi Nakayama, Yokohama (JP); Masahiko Kikuzawa, Souka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/095,678

(22) Filed: Jun. 10, 1998

(30) Foreign Application Priority Data

Jun. 30, 1997 (JP) .............................................. 9-174084

(51) Int. Cl.
*H04N 5/222* (2006.01)
*G03B 15/03* (2006.01)
*G03B 15/02* (2006.01)

(52) U.S. Cl. ....................... 348/371; 396/159; 396/180; 362/3

(58) Field of Classification Search ................. 396/166, 396/180, 189, 159–162, 164; 348/370, 371, 348/258, 260; 355/67; 362/3–4, 6, 15
See application file for complete search history.

(56) References Cited

U.S. PATENT DOCUMENTS

| 4,593,312 A | * | 6/1986 | Yamasaki .................... 348/371 |
| 4,768,876 A | * | 9/1988 | Okino ...................... 348/229.1 |
| 4,805,037 A | * | 2/1989 | Noble et al. ................. 348/371 |
| 5,006,871 A | * | 4/1991 | Noble .......................... 348/64 |
| 5,097,340 A | * | 3/1992 | Tanabe et al. ............... 348/296 |
| 5,229,856 A | * | 7/1993 | Koshiishi ..................... 348/312 |
| 5,438,367 A | * | 8/1995 | Yamamoto et al. ......... 348/371 |
| 5,517,243 A | * | 5/1996 | Kudo et al. .................. 348/296 |
| 5,682,201 A | * | 10/1997 | Ogawa ....................... 348/371 |
| 5,936,708 A | * | 8/1999 | Saita .......................... 347/226 |
| 5,946,035 A | * | 8/1999 | Suh ............................ 348/371 |
| 5,956,535 A | * | 9/1999 | Tohyama ................ 315/241 P |
| 6,049,355 A | * | 4/2000 | Kameyama ............... 348/222.1 |
| 6,753,920 B1 | * | 6/2004 | Momose et al. ............ 348/371 |

FOREIGN PATENT DOCUMENTS

| JP | 05-1191715 | 7/1993 |
| JP | 05-260369 | 10/1993 |
| JP | 07-288748 | 10/1995 |
| JP | 09130657 A | * 5/1997 |

OTHER PUBLICATIONS

English Translation of Paragraph 8 of JP 05–191715.
English Translation of Paragraph 25 of JP 07–288748.
English Translation of Abstract of JP 05–260369.

* cited by examiner

*Primary Examiner*—Wendy R. Garber
*Assistant Examiner*—John M Villecco
(74) *Attorney, Agent, or Firm*—Morgan & Finnegan, L.L.P.

(57) ABSTRACT

An apparatus employing a flashlight device such as an electronic still camera, a camcorder, etc. with an adequate luminous quantity during sensing an image, independently of an electric charge accumulation period in an image sensing device, thereby to make an adequate exposure obtainable no matter what a shutter speed may be.

4 Claims, 11 Drawing Sheets

FIG.8
(a)
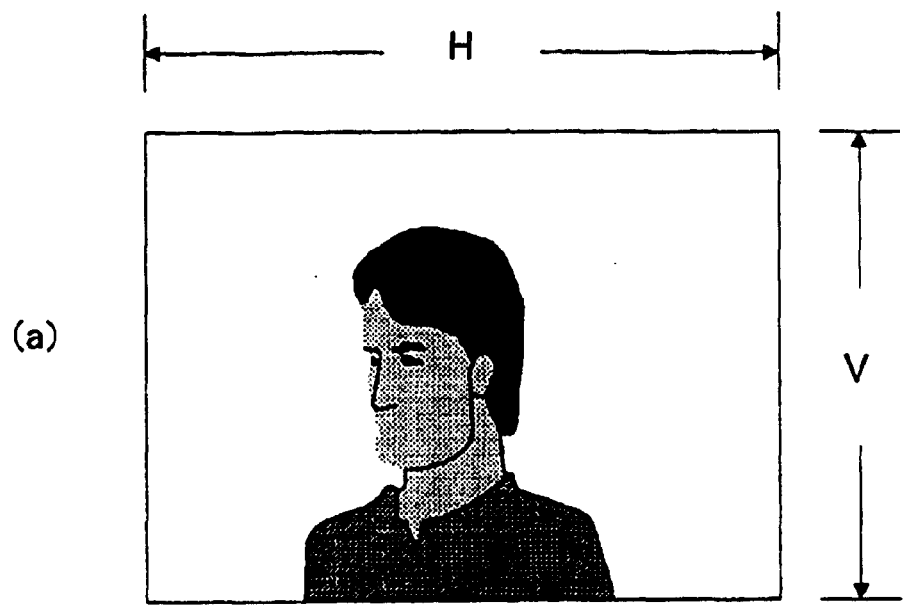
(b)
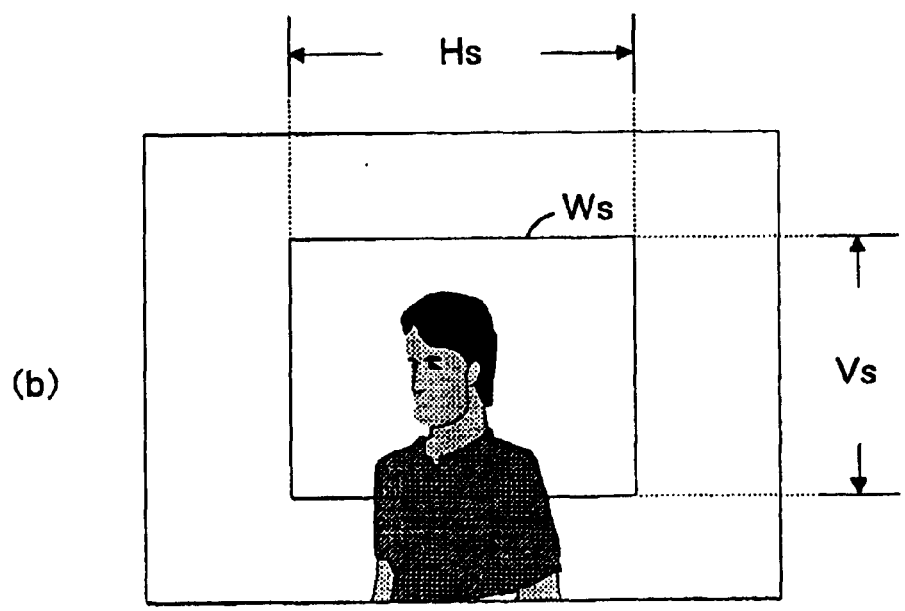

IMAGE SENSING APPARATUS

BACKGROUND OF THE INVENTION

1. Field of the Invention

The present invention relates mainly to an image sensing apparatus which utilizes a flashlight device.

2. Brief Description of the Related Art

In an image sensing apparatus such as an electronic still camera, an employment of an electronic flashlight device has been indispensable up to now when a subject illuminated by a low intensity light is sensed an image. Because a period for sensing the image in the electronic camera is an 1/60 second if a specification of the image is, for instance, of the National Television System Committee (referred to as "NTSC") Standard, an accumulation time of an image sensing device (sensor) is made coincident in general with the image sensing period in many cases. However, sensing the images is also capable either in a comparatively longer period or in a comparatively shorter period than that of the NTSC Standard. The image sensing period described herein corresponds to a so called shutter speed of a silver halide film camera. When the electronic flashlight device is employed to the electronic still camera, discharging the flashlight lamp is required to be carried out within the period for sensing the image. To satisfy the condition mentioned above, the flashlight emission has to be performed synchronously with a synchronous signal superimposed on an image signal.

When a high shutter speed is used in the silver bromide film camera employing a focal plane shutter, a post curtain of the shutter begins closing before a fore curtain of the shutter completes opening. To provide a film with a uniform exposure light on that occasion, a flashlight device which can emit a flat light emission has been invented. The flat light emission herein means an emission which performs a continuous flashlight emission to enable obtaining a stable light emission for a certain period of time.

FIG. 9 is a block diagram showing a constitution of a prior image sensing system seen in a conventional electronic still camera equipped with above-mentioned flashlight device. In the figure, a numeric sign 1 stands for a lens for sensing the image, 2 stands for the image sensor, 3 stands for a signal processing circuit (processor) which generates the image signal from an output signal produced from the image sensor 2, 4 stands for a timing generator (referred to as "TG") which controls accumulating and reading-out behaviors of electric charges in the image sensor 2, 5 stands for the electronic flashlight device and 6 stands for a stroboscope (a prior trade name of an electronic flashlight tube) control device which instructs the electronic flashlight device 5 to initiate the discharging by applying a flashlight emission initiating signal S1 to the flashlight device 5.

In the electronic still camera constituted as mentioned above, rays of light incident through the lens 1 into the image sensor 2 are transformed photo-electrically into electric charges and accumulated herein. When the timing generator 4 applies a pulse signal for reading-out the electric charges to the image sensor 2, the accumulated charges are transferred to the signal processing circuit 3, from which the transferred charges are transmitted as the image signal. Herein the stroboscope control circuit 6 controls so that the flashlight device 5 emits the flashlight during the charge accumulating period of the image sensor 2.

FIG. 10 is a view for illustrating a timing of aforesaid flashlight emission emitted from device 5 and the timing of aforesaid image signal, which shows the charge accumulating period of the image sensor 2, the light emission quantity of the flashlight device 5, the pulse signal for reading-out the charges from the image sensor 2 and an output image signal.

As shown in the figure, the image sensor 2 initiates the charge accumulation at a timing of T1, the accumulated charge quantity is read-out at a timing of T2 and the light emission quantity emitted from the electronic flashlight device 5 is controlled so that the flashlight emission is completed between the timing of T1 and the timing of T2. The signal charges which are read-out at the timing of T2 are transmitted as the image signal during the period between the timing of T2 and the timing of T3.

The employment of the stroboscopic flashlight, which serves as a means for supplementing the light quantity when a subject illuminated under a low intensity light or under a rear light is sensed the image, has so generally accepted in a silver salt film camera that the flashlight device is not only capable of being equipped but also built-in into a popular type camera and even into a returnable camera which is called a "single use camera" in US and a "film with a lens" in Japan, respectively. Especially in recent years, applications of the stroboscopic lamps have been widespread even to the electronic still camera and even to a camcoder.

Among the stroboscopic flashlight devices, there is one having a variable illuminating angle called a "zoom stroboscopic device". The control of the illuminating angle in the zoom stroboscopic devices is performed in general in accordance with a focal distance of the lens. If the focal distance of a zoom lens is, for instance, shortened toward a wide angle side, the illuminating angle is controlled to be enlarged so that the stroboscopic light can illuminate all the area sensed the image. If the focal distance of the zoom lens is lengthened toward a telephoto side on the contrary, the illuminating angle is controlled so as to be small.

FIG. 11 is a view showing a focal position of the lens and an illumination-capable area of the stroboscopic lamp. In the figure, W1 indicates the image sensing area when the focal distance of the lens is F1 while W2 indicates the image sensing area when the focal distance of the lens is F2, respectively. The stroboscopic tube used herein can illuminate up to the image sensing area W1 of which illumination area is represented by S.

However, when the shutter speed is fast and the accumulation time of the image sensor is short in the image sensing apparatus utilizing aforesaid conventional flashlight device, many cases where the flashlight emission timing of the flashlight device does not coincide with the shutter timing or the flashlight emission period exceeds the exposure time have frequently taken place. Consequently, there has been a problem that an adequate exposure cannot been attained.

On the other hand, there exist extremely many variations in species of lens because it is required to cope with various situations for sensing the image. Even in the zoom lens, for instance, there are a wide angle-sided lens of which focal distance varies between 28 and 80 mm and a telephoto-sided lens of which focal distance varies between 100 and 300 mm. Those situations are similar to the zoom stroboscopic devices.

As a result, in the camera which can exchange either the lens or the stroboscopic lamp, there arises a problem that the illuminating range of the flashlight device cannot cover the image sensing area, depending on a combination manner of the lens and the stroboscopic lamp to be used.

Namely, if the focal distance is F1 as shown in FIG. 11, the stroboscopic lamp illuminates all of the subject located within the image sensing region W1 as expected. If the focal distance turns to F2, the lamp can only illuminate partially the illumination range S located within the image sensing area W2. Consequently, peripheral portions of the sensed image turn dark. Accordingly, a camera user has always to be aware of both the focal distance of the lens and the illuminating angle of the stroboscopic lamp which are to be mounted, respectively, during sensing the image.

SUMMARY OF THE INVENTION

The present invention is carried out to solve above-mentioned problems. An object of the present invention is to provide an image sensing apparatus which can supply an adequate light quantity from an electronic flashlight device independently of an electric charge accumulation period and can afford a suitable exposure value no matter what a shutter speed may be.

Another object of the present invention is to provide an image sensing apparatus which can perform sensing an excellent image illuminated by a stroboscopic lamp combined with any species of lens.

Image sensing apparatuses according to the present invention are constituted as follows:

(1) An image sensing apparatus employing a flashlight emission device, comprising:

flashlight control means which terminates a flashlight illumination emitted from the flashlight emission device; and detecting means which detects a vertical synchronous signal of an image sensing signal:

wherein the flashlight illumination emitted from the flashlight emission device is terminated synchronously with the vertical synchronous signal.

(2) The image sensing apparatus according to (1), further comprising:

another flashlight control means which initiates the flashlight illumination emitted from the flashlight emission device; and a counter which performs a counting operation synchronously with the vertical synchronous signal:

wherein the flashlight emission is initiated when a value counted by the counter amounts to a certain specified value.

(3) The image sensing apparatus according to (1) and (2), wherein the flashlight device is an electronic flat light emission device.

(4) An image sensing apparatus employing a flashlight emission device, comprising:

first flashlight control means which terminates a flashlight discharging of the flashlight emission device;

second flashlight control means which initiates the flashlight discharging of the flashlight emission device;

a counter which initiates a counting operation synchronously with an initiation of the flashlight discharging in the electronic flashlight emission device; and detecting means which detects a vertical synchronous signal of an image sensing signal:

wherein the flashlight emission is initiated synchronously with the vertical synchronous signal and the flashlight emission is terminated when a value counted by the counter amounts to a certain specified value.

(5) The image sensing apparatus according to (4), wherein the flashlight emission device is a flat light emission device.

(6) An image sensing apparatus employing an electronic flashlight emission device, comprising:

frame position arithmetic means for calculating a position of a frame indicating a range, which the flashlight device illuminates, on a display image field;

frame signal generating means for generating a frame signal corresponding to the computed frame position of the illuminated range on the display image field; and display means for displaying the frame indicating the illuminated range in response to receiving the frame signal:

wherein the frame position arithmetic means calculates the position of the illuminated range, depending upon information about a zooming position of an image sensing lens and about the illuminating range of the flashlight device, and;

the frame signal generating means generates the frame signal corresponding to the frame indicating the illuminating range, depending on an arithmetic result computed about the position of the frame indicating the illuminating range.

(7) The image sensing apparatus according to (6), wherein information about the illuminating range for notifying the range that the flashlight emitted from the flashlight device illuminates is applied to the flashlight device.

(8) The image sensing apparatus according to (6) and (7), wherein the frame position arithmetic means computes the frame position indicating the illuminating range by computing the illumination range of the flashlight device with respect to an image sensing-capable range that is a range wherein the image sensing device can sense the image.

BRIEF DESCRIPTION OF THE DRAWINGS

FIG. 8 is a view showing a displayed image on a liquid crystal device (referred to as "LCD" hereinafter) panel;

DETAILED DESCRIPTION OF THE PREFERRED EMBODIMENTS

Hereinafter detailed are the preferred embodiments according to the present invention with reference to FIG. 1 to FIG. 8. The best mode contemplated by the inventors during carrying out the present invention into practice is also described corresponding to the preferred embodiments.

Embodiment 1

Figure 1:
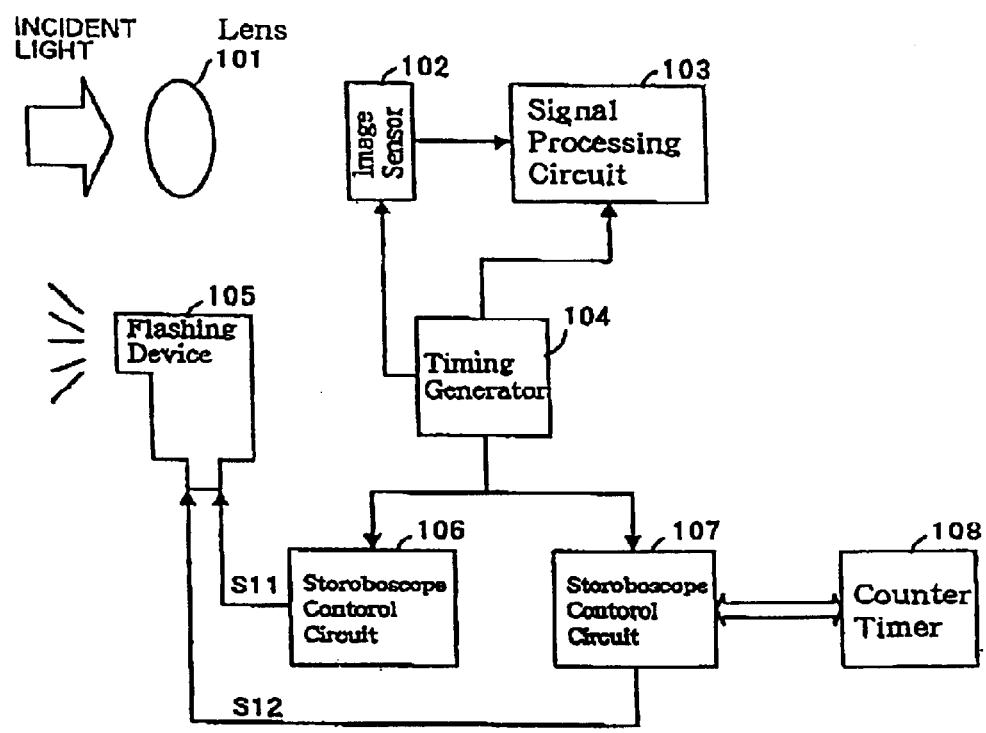
FIG. 1 is a block diagram showing a constitution of Embodiment 1 according to the present invention.

FIG. 1 is a block diagram showing a constitution of Embodiment 1 according to the present invention, namely, a constitution of an electronic still camera provided with an electronic flashlight emission device of which flashlight initiation and flashlight termination are controllable from an outside so as to be capable of coping with a high-speed shutter.

In FIG. 1, a numeric sign 101 stands for a lens in use for sensing an image, 102 stands for an image sensing device which transforms an image sensing light incident through the image sensing lens 101 photo-electrically into an electric signal, 103 represents a signal processing circuit for generating a luminance signal and a color signal from the output image signal which is produced from the image sensor 102, 104 stands for a timing generator (referred to as "TG") which controls accumulating and reading-out operations of electric charges in the image sensor 102 and generates a synchronous signal for use in an image signal, 105 stands for an electronic flashlight emitting device, 106 stands for a stroboscope circuit (1) which controls a terminating operation of the flashlight emitted from the electronic flashlight emitting device and 107 stands for another stroboscope circuit (2) which initiates a counting operation of a counter timer 108 synchronously with the synchronous signal generated from the timing generator 104. A flashlight emission terminating signal S11 is transmitted from the stroboscope control circuit (1) 106 to the flashlight emitting device 105 while a flashlight emission initiation signal S12 is transmitted from stroboscope control circuit (2) 107 to the flashlight emitting device 105.

In aforesaid constitution, the image sensing light incident from a subject is focused through the lens 101 onto the image sensing device 102. The signal light incident into the image sensor 102 is photo-electrically transformed herein into the electric signal which is converted by an aid of the signal processing circuit 103 into the image signal to be transmitted. During the transformation and the conversion, the timing generator 104 controls the charge accumulation period of the image sensor 102 and the read-out operation of the accumulated charges as well as supplies the synchronous signal for use in the image signal to the signal processor 103 and to the stroboscope control circuits 106 and 107.

Figure 2:
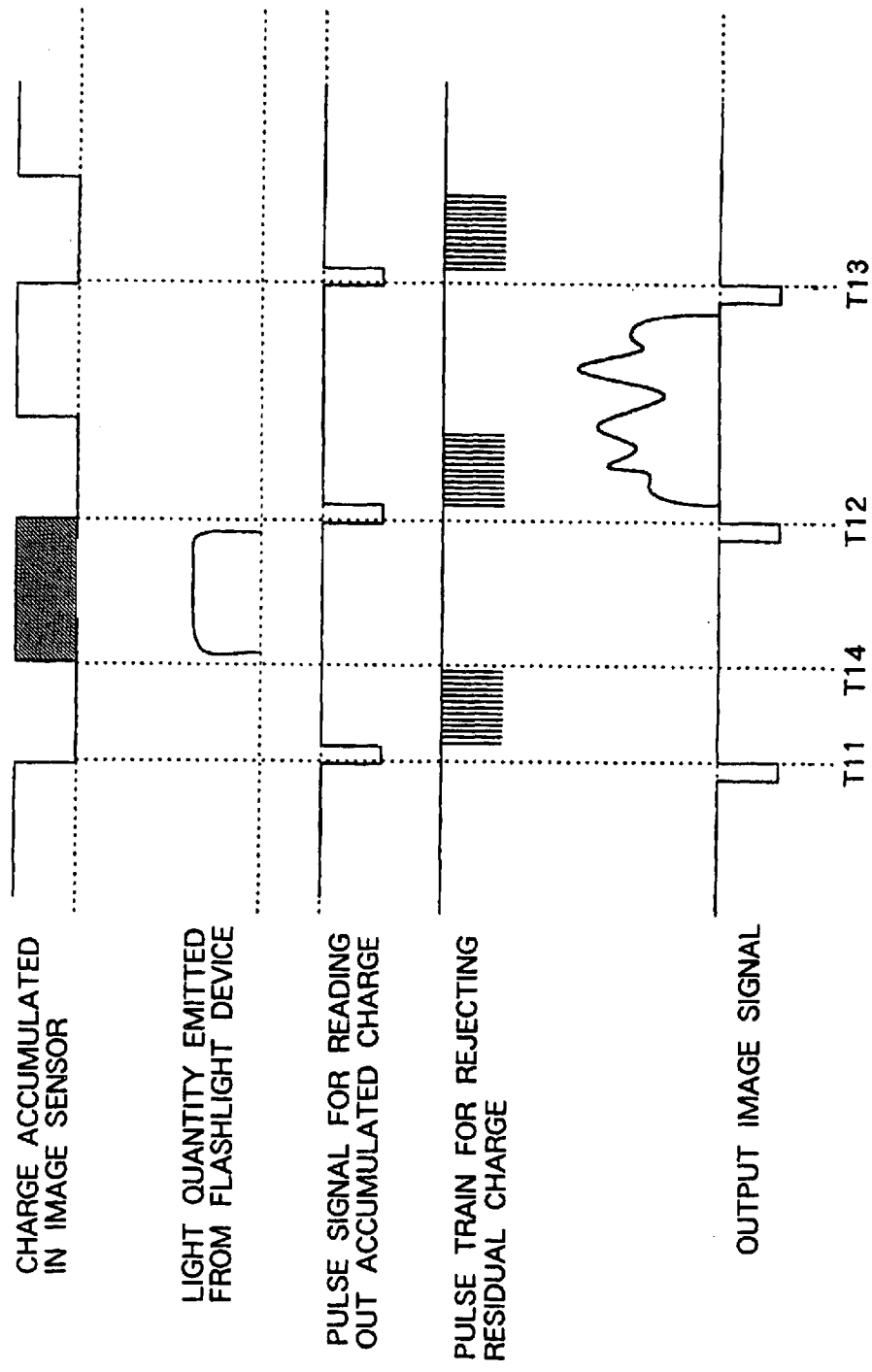
FIG. 2 is a timing chart showing control operations of Embodiment 1.

FIG. 2 is the view showing the control operations in the present embodiments which indicates a timing sequence of the image signal and the flashlight illumination emitted from the flashlight emitting device. Namely, the figure illustrates the accumulation period of the electric charges in the image sensor 102, a flashlight emission timing together with an flashlight quantity emitted from the flashlight device 105, a pulsed signal for reading-out the electric charges from the image sensor 102, the output image signal and a pulse train for rejecting the residual charges for use in the high-speed shutter.

The image sensing device 102 is controlled so as to start accumulating the electric charges at a timing T14, which is then controlled to be read-out at another timing T12. A flashlight emitting operation is controlled to be completed during a period from a still another timing T11 to the timing T12. Signal charges which are read-out at the timing T12 is transmitted as the image signal during another period between the timing T12 and a further still another timing T13.

When the image sensing is performed herein by a use of the high-speed shutter, the charge rejecting pulse train is transmitted from the timing generator 104 so that the image sensor 102 does not accumulate the electric charges during a period from T11 to T14. The stroboscope control circuit (2) 107 initiates to operate the counter timer 108 at a timing corresponding to an accumulation initiating timing of the image sensor 102, namely at the timing T14, in response to receiving a vertical synchronous signal on a beginning of a field which is sensed the images by a use of the flashlight emission device 105, namely at the timing T11. After the counter timer 108 counts a certain specified time, the stroboscope control circuit (2) 107 produces a flashlight emission initiating signal S12 which makes the flashlight device 105 begin to emit the flashlight.

In response to another vertical synchronous signal received at an end of the field for sensing the image by the use of the flashlight emission device 105 which corresponds to the timing T12, the stroboscope control circuit (1) 106 produces a flashlight emission terminating signal S11 which inhibits the flashlight emission device 105 from emitting the flashlight. When the accumulated charge reading-out pulse is applied from the timing generator 104, the electric charges are transferred from the image sensor 102 to the signal processing circuit 103, which are then transmitted as the image signal during a subsequent image field.

By synchronizing the terminating timing of the flashlight emitted from the flashlight device 105 with the vertical synchronous signal as mentioned above, a synchronization of a discharging period of the flashlight device with the accumulation period of the image sensor 102 turns capable during sensing the image even by the use of the high speed shutter, which can provide an excellent sensing image by the use of the stroboscopic lamp.

Incidentally, it is only requested that a discharging duration period of the flashlight is shorter than the accumulation period of the image sensor 102 so that the flashlight emission initiating timing may be later than the accumulation initiating timing.

Embodiment 2

Figure 3:
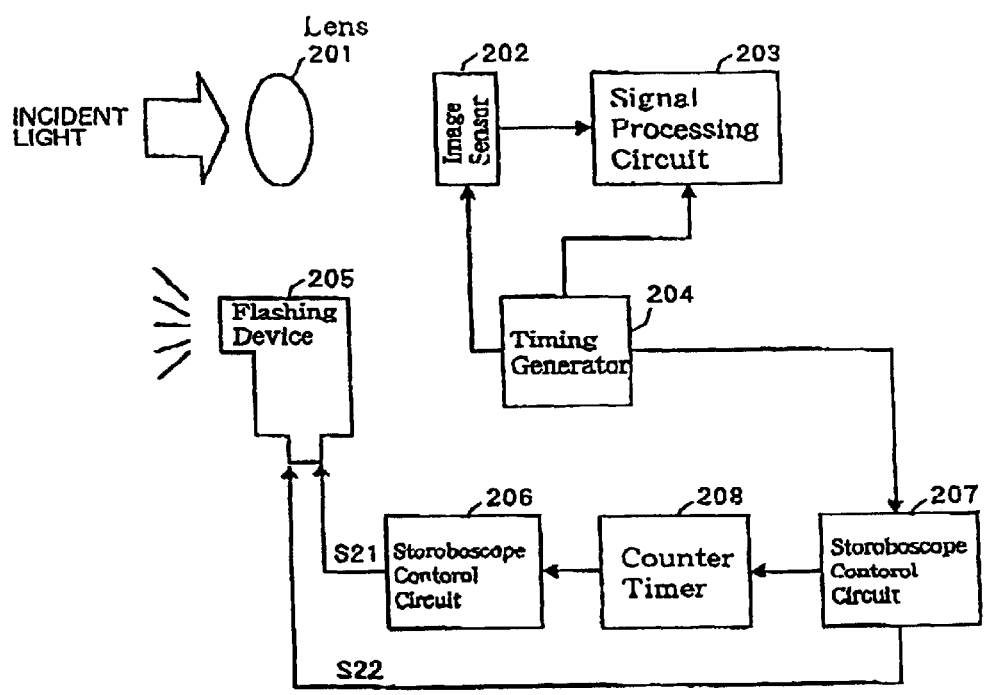
FIG. 3 is a block diagram showing a constitution of Embodiment 2 according to the present invention.

FIG. 3 is a block diagram of Embodiment 2 according to the present invention for indicating another constitution of another electronic still camera of which flashlight initiation and flashlight termination can be controlled from the outside, similarly to FIG. 1.

In FIG. 3, a numeric character 201 stands for a lens for use in sensing an image, 202 stands for an image sensor which photo-electrically transforms an incident light incoming through the lens 201 into an electric signal, 203 stands for a signal processing circuit which generates a luminance signal and a color signal in response to receiving the signal produced from the image sensor 202, 204 stands for a timing generator which controls a charge accumulating operation and a charge reading-out operation of the image sensor 202 as well as generates a synchronous signal of an image signal, 205 stands for a flashlight device, 206 stands for a stroboscope control circuit (1) which controls a terminating operation of the flashlight device 205 and 207 stands for another stroboscope control circuit (2) which controls an initiating operation of the flashlight device 205 synchronously with the synchronous signal applied from the timing generator 204. Herein a flashlight terminating signal S21 is applied from the stroboscope circuit (1) 206 to the flashlight emitting device 205 while a flashlight initiating signal S22 is applied from the stroboscope circuit (2) 207 to the flashlight device 205.

Similarly to Embodiment 1 shown in FIG. 1, an image sensing light incident from a subject is focused through the lens 201 onto the image sensor 202. Herein an optical signal applied to the image sensor 202 is transformed photo-electrically into the electric signal, which is then converted through the signal processor 203 into the image signal to be transmitted. During that, the timing generator 204 controls a charge accumulating period and a reading-out operation of the accumulated charges as well as supplies a synchronous signal of the image signal to each of the signal processing circuit 203 and the stroboscope control circuit (2) 207.

Figure 4:
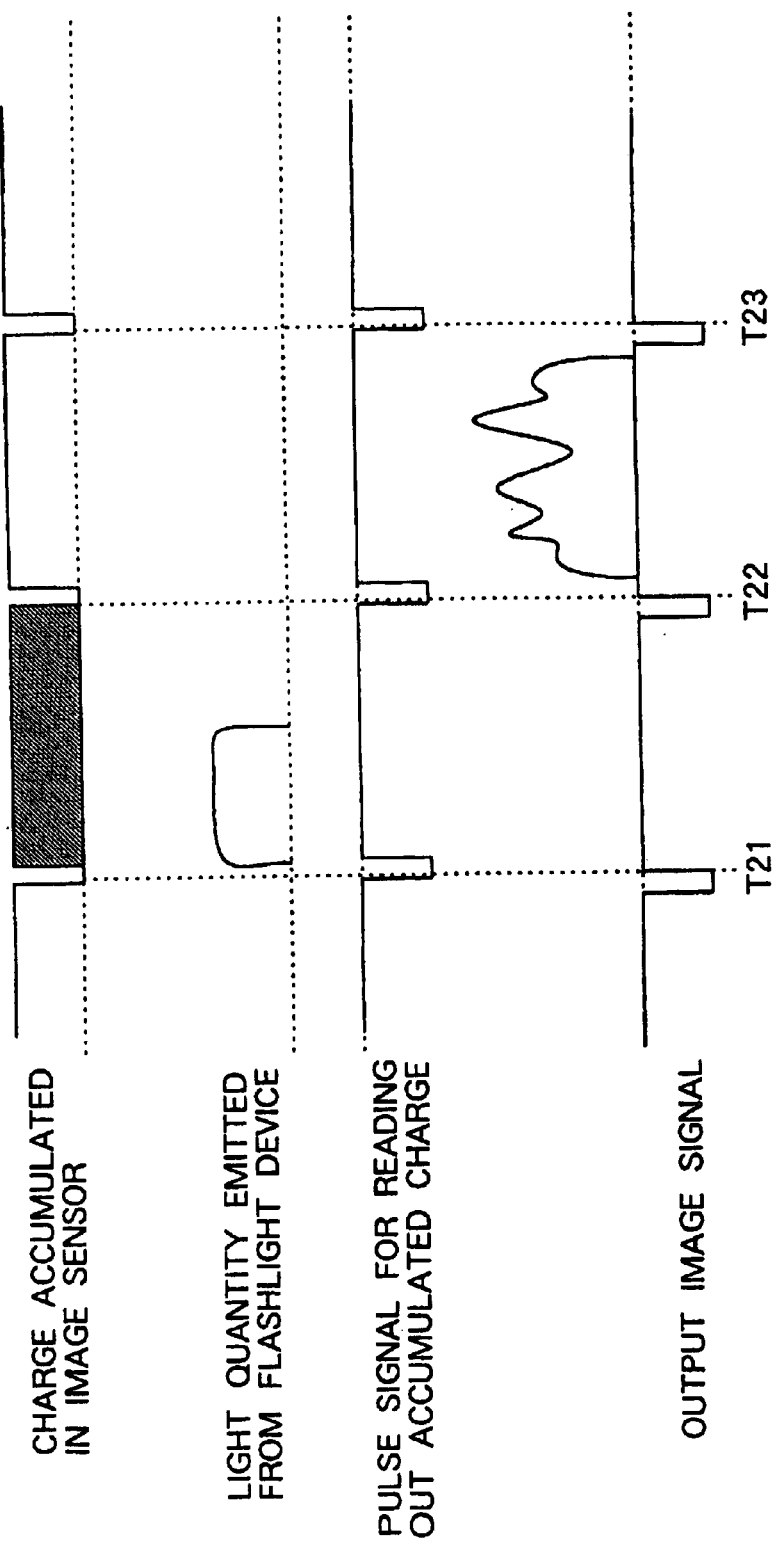
FIG. 4 is a timing chart showing control operations of Embodiment 2.

FIG. 4 is a view showing control operations according to the present embobiment, wherein a timing sequence of the image signal and the flashlight emitted from the flashlight emitting device 205 is illustrated. Namely, the electric charge accumulating period of the image sensing device 202, an emitting timing and an emitted quantity of the flashlight device 205, the charge reading-out pulse signal of the image sensing device 202 and the output image signal are indicated.

The image sensor 202 is controlled so as to initiate accumulating the electric charges at a timing T21, which are read-out at another timing T22 while a discharging period of the flashlight lamp is controlled so as to be completed during a period from the timing T21 to the timing T22. The signal charge read-out at the timing T22 is transmitted as the image signal during a period from the timing T22 to a timing T23.

On the other hand, in response to receiving a vertical synchronous signal at the timing T21 which appears on a beginning of an image field to be sensed by a use of the flashlight device 205, the stroboscope circuit (2) 207 produces the flashlight initiating signal S22 to initiate the flashlight emission from the flashlight device 205 and simultaneously begins to operate the counter timer 208 for a period corresponding to a certain specified light quantity. After a certain specified period elapses, the counter timer 208 renders the stroboscope control circuit (1) 206 terminate the flashlight emission. In response to receiving a flashlight terminating signal applied through the counter timer 208 from the timing generator 204, the stroboscope control circuit (1) 206 produces the flashlight terminating signal S21 which prohibits the flashlight device 205 from emitting the flashlight. When the read-out pulse of the accumulated charges is applied from the timing generator 204 to the image sensor 202, the accumulated charges are transferred from the image sensing device 202 to the signal processing circuit 203 which are transmitted therefrom as the image signal during a subsequent field.

By synchronizing the flashlight initiation of the flashlight device 205 with the vertical synchronous signal and by emitting the flashlight from the flashlight device 205 for the specified period as mentioned above, it turns capable to sense the image synchronously with the accumulation period of the image sensor 202 under an adequate exposure condition, which can provide us with an excellent stroboscopic image sensing.

Incidentally, the discharging period for emitting the flashlight is requested only to be completed during the charge accumulation period so that the flashlight emission may begin later than a timing for beginning accumulation.

Embodiment 3

Subsequently, Embodiment 3 according to the present invention is described with reference to FIGS. 5, 6, 7 and 8. In the present embodiment, a camcorder capable of being equipped with a stroboscopic flashlight lamp is used. Herein all numerical values representing focal distances described in the present embodiment have been converted to the values for use in a film camera which employs silver halides as photosensitive materials. Further, all luminance angles of the zoom stroboscope tube are designated by their focal distance values as well known. Those values designated by focal distance mean that the stroboscopic lamp can illuminate all of an image sensing area if the lens is located on the focal distance of the stroboscopic lamp.

Figure 5:
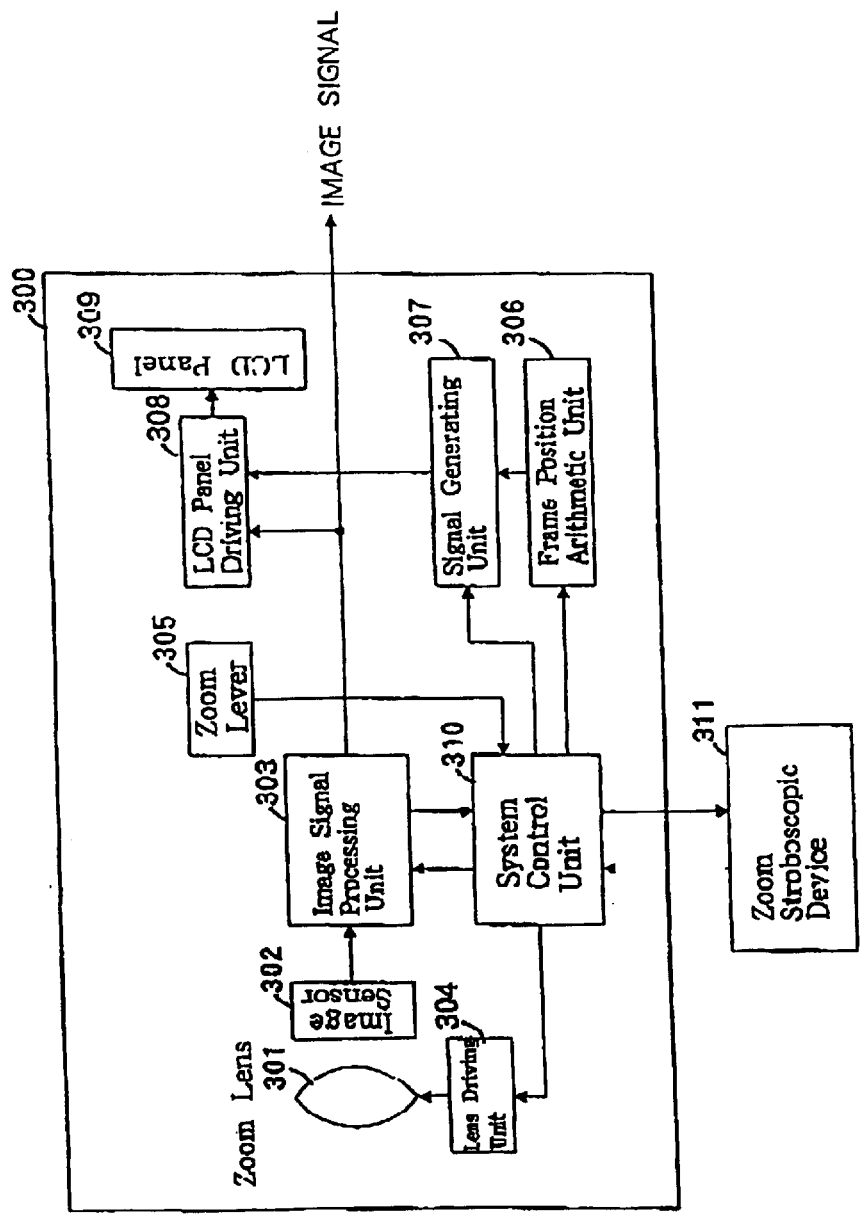
FIG. 5 is a block diagram showing a constitution of Embodiment 3 according to the present invention.
Figure 6:
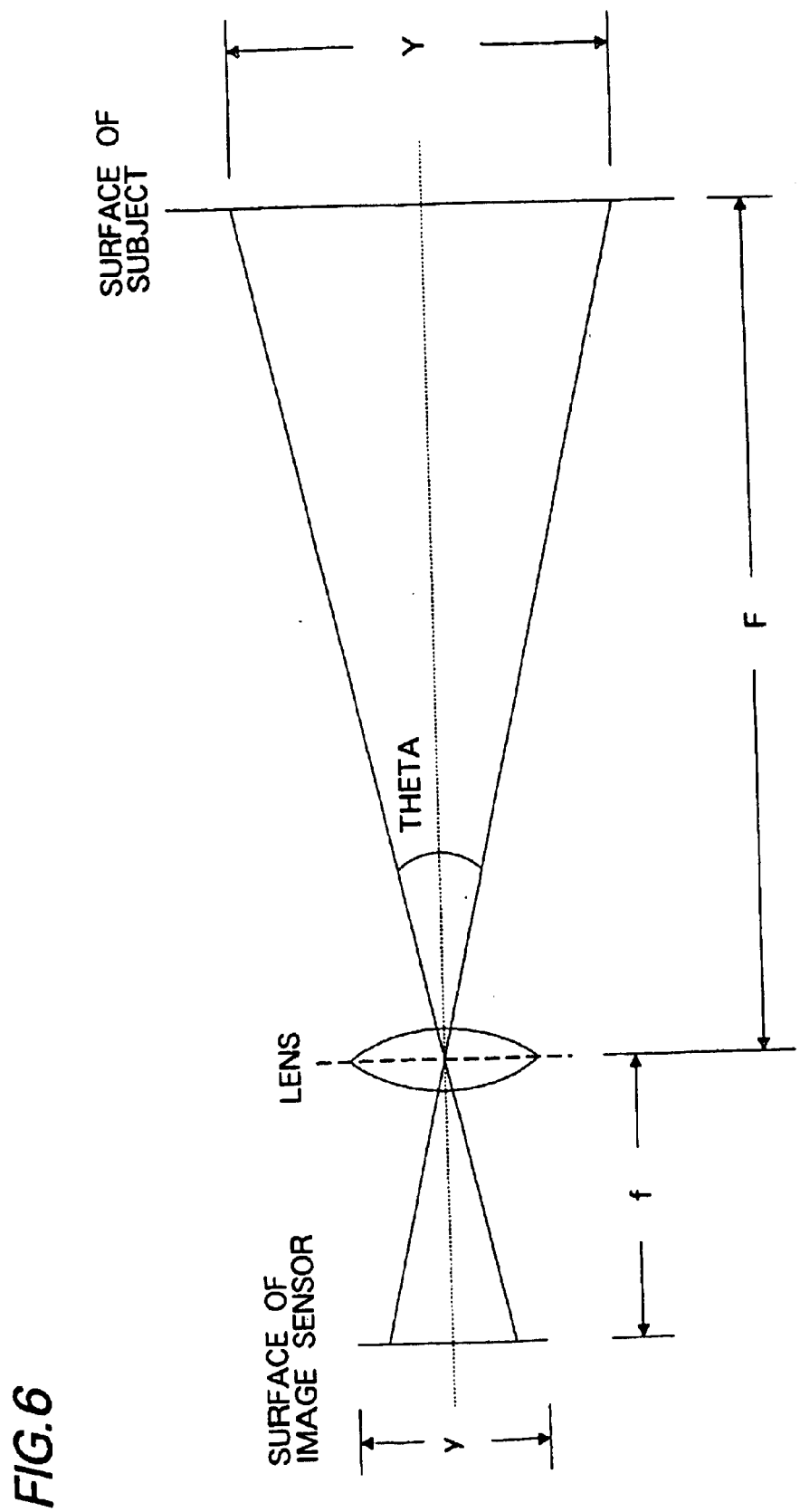
FIG. 6 is a view illustrating a relationship between a focal distance and an illuminating range in Embodiment 3.
Figure 7:
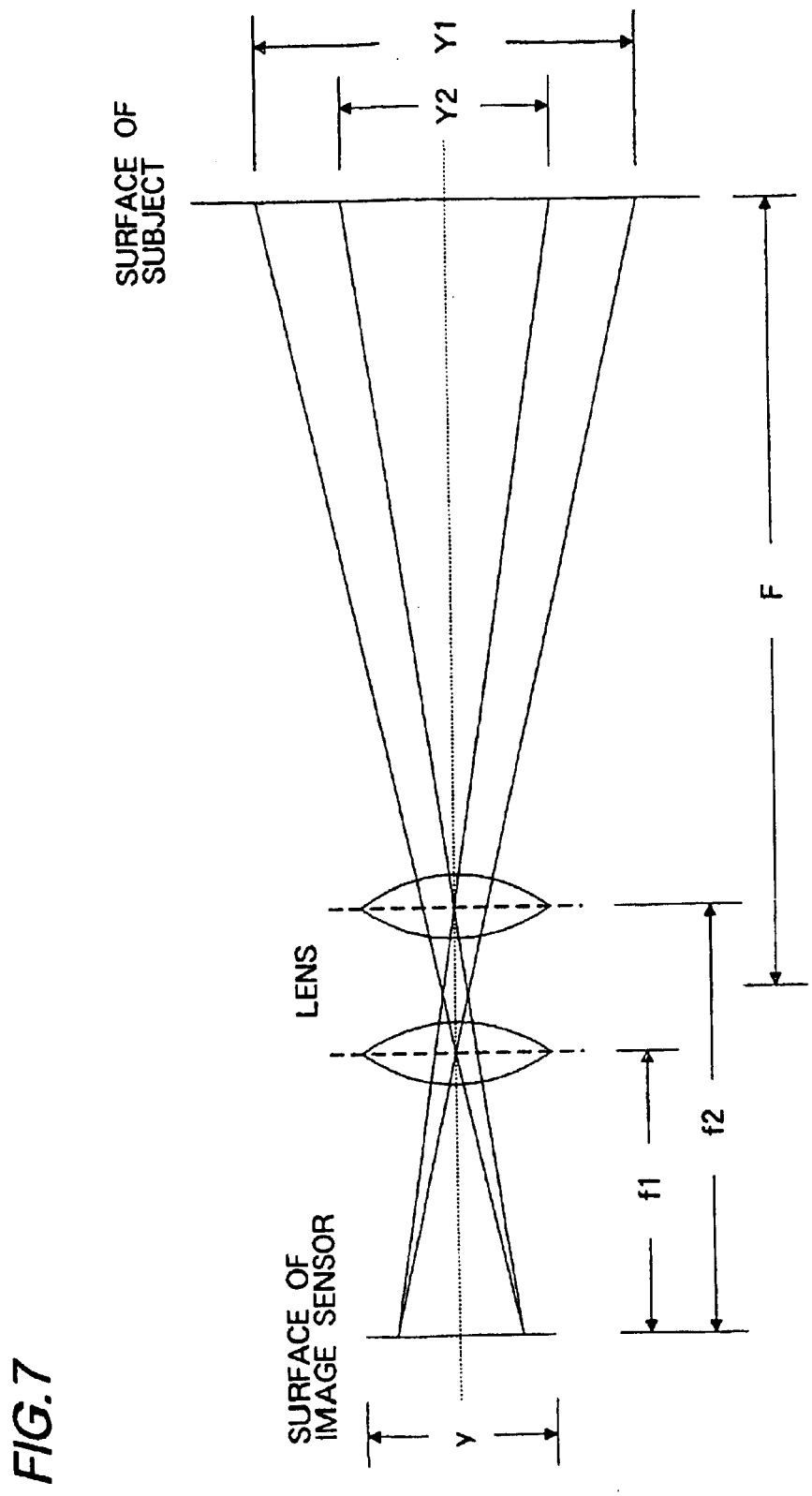
FIG. 7 is a view illustrating a focal distance dependence of an image sensing-capable range in Embodiment 3.
Figure 9:
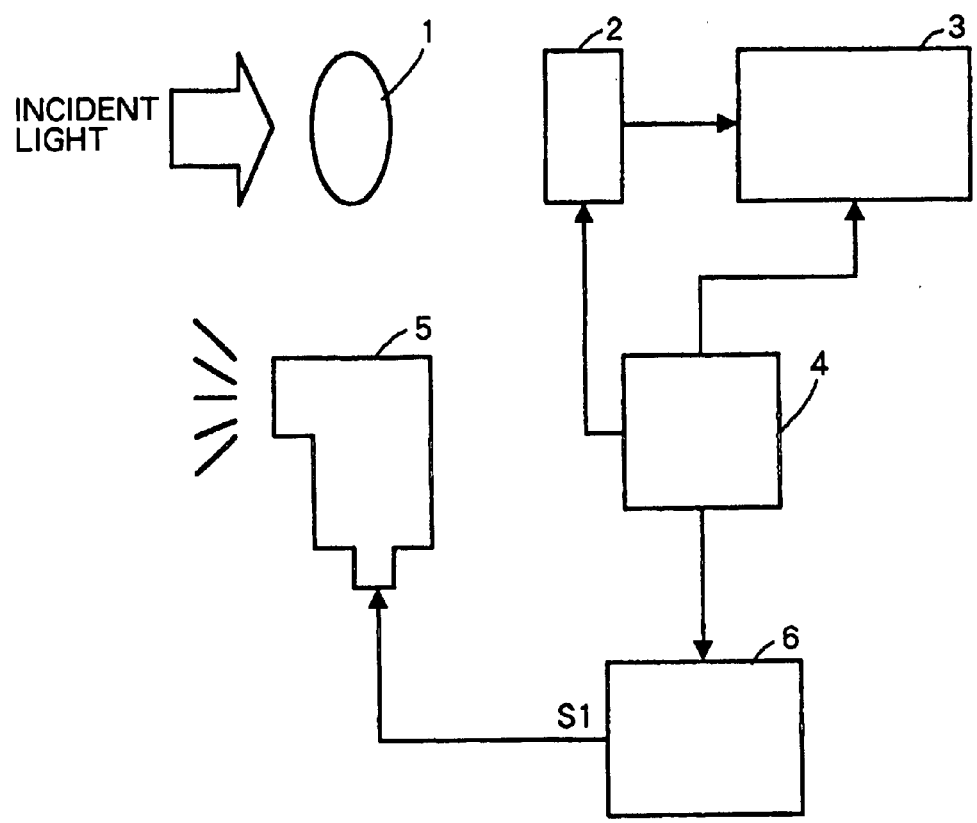
FIG. 9 is a block diagram showing a constitution of a prior art.
Figure 10:
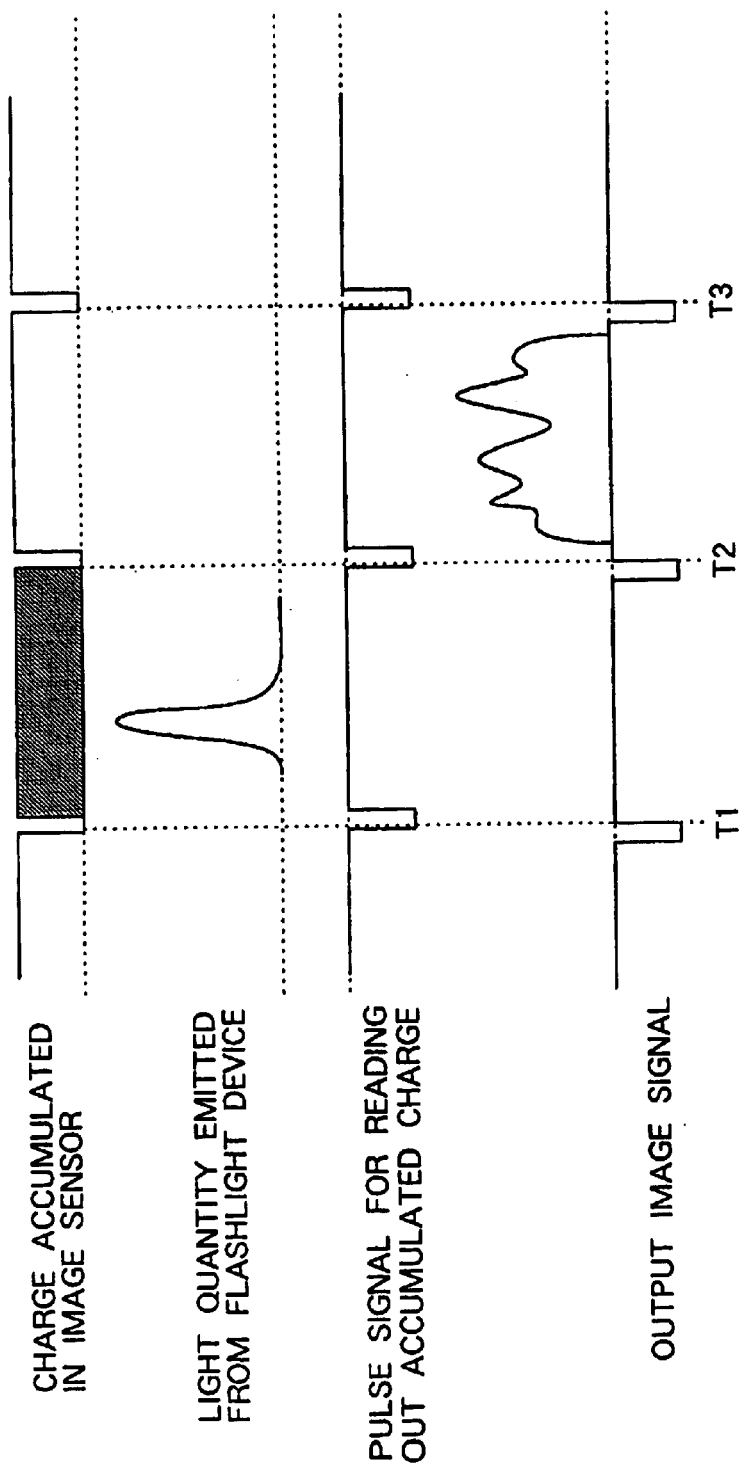
FIG. 10 is a timing chart showing control operations of the prior art.
Figure 11:
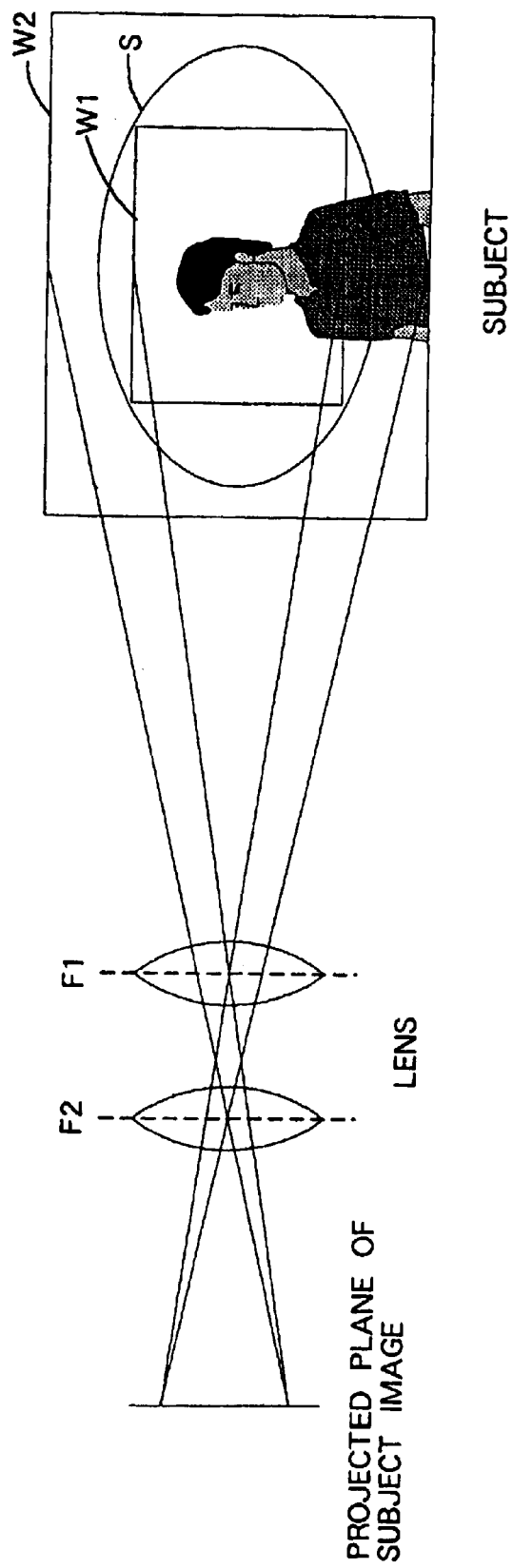
FIG. 11 is a view showing a relationship between the focal distance and the illumination-capable range of the prior art.

FIG. 5 is a block diagram showing a constitution of the present embodiment, FIG. 6 is a view showing a relationship between a focal distance and an image sensing range, FIG. 7 is a view showing a focal distance dependence of an image sensing-capable range and FIG. 8 is a view showing a displayed image on an LCD panel. Herein FIG. 8(a) shows a case wherein the focal distance is f2, namely 50 mm, while FIG. 8(b) corresponds to another case wherein the focal distance is f1, namely 28 mm.

In FIG. 5, a numeric character 300 stands for a main body of an image sensing apparatus while 311 stands for a zoom stroboscopic device. In the main body 300 of the image sensing apparatus, 301 stands for a zoom lens for focusing a subject image onto an image sensing device 302 which photo-electrically transforms an incident image sensing light into an electric signal.

Beside those mentioned above, 303 stands for an image signal processing unit for processing the electric signal transferred from the image sensing device 302 to generate an image signal, 304 stands for a lens driving unit for driving the lens 301, 305 stands for a zoom lever for performing a zooming operation between a telephoto angle and a wide angle, 306 stands for a frame position arithmetic unit of a stroboscopically illuminated range for computing a position of a frame enclosing a range that the flashlight emitted from the zoom stroboscope unit 311 illuminates, 307 stands for a signal generating unit of the frame enclosing the stroboscopically illuminated range for generating a signal which indicates the frame enclosing the range that the zoom stroboscope unit 311 illuminates, 308 stands for an LCD panel driving unit for driving an LCD panel 309 so as to display the image on the LCD panel 309 and 310 stands for a system control unit for controlling each part included in the present image sensing apparatus.

Incidentally, the focal distance of aforesaid zoom lens 301 varies between 28 and 105 mm while the illuminating angle, namely the focal distance, of the zoom stroboscope 311 varies between 50 and 105 mm.

In the apparatus constituted mentioned above, the image sensing light incident through the zoom lens 301 from the illuminated subject is focused on a light receiving surface of the image sensing unit 302 to be transformed herein into the electric signal, which is then applied to the image signal processing unit 303. The applied electric signal is herein subjected to specified processings to be transmitted as the image signal. The image signal transmitted from the image signal processing unit 303 is further transferred from the main body 300 of the image sensing apparatus to an outside as well as to the LCD panel driving unit 308.

The system control unit 310 controls each part included in the present apparatus so as to generate aforesaid image signal as well as controls the lens driving unit 304 in response to the operation of the zoom lever 305. The lens driving unit 304 drives the zoom lens 301 either toward the telephoto side or toward the wide angle side.

Herein a stepping motor is employed to drive the zoom lens 301. The system control unit 310 counts driven steps of the stepping motor during the control of the driven zoom lens in order to compute the zoom position of the zoom lens 301, which is then retained as information about the focal distance. On the other hand, the system control unit 310 supplies information about the focal distance of the zoom lens to the zoom stroboscope unit 311.

When information about the focal distance is applied from aforesaid system control unit 310, the zoom stroboscope unit 311 controls the illuminating angle of the stroboscopic flashlight corresponding to received information about the focal distance of the zoom lens 301 as well as transmits as actual information about the focal distance, which is converted from the actual illuminating angle of the flashlight emitted from the zoom stroboscope unit 311, to the system control unit 310.

The system control unit 310 transfers applied information about the focal distance of the zoom stroboscope unit 311 to the frame position arithmetic unit 306 of the stroboscopically illuminated range, which computes the position of the frame enclosing the stroboscopically illuminated range out of transferred information about the focal distance of the zoom stroboscope unit 311 to apply computed information about the frame position to the frame signal generating unit 307 of the stroboscopically illuminated range.

The frame signal generating unit 307 of the stroboscopically illuminated range generates the signal of the frame enclosing the stroboscopically illuminated range, depending upon applied information about the frame position, and transmits the generated frame signal to the LCD panel driving unit 308. Beside those mentioned above, the frame signal generating unit 307 of the stroboscopically illuminated range also controls a switching operation of the generated frame signal between transmitting to the LCD panel driver 308 and cutting off, in response to receiving a control signal applied from the system control unit 310.

The LCD panel driving unit 308 drives the LCD panel 309 so as to synthesize a synthesized signal to be displayed on the LCD panel 309 out of the image signal applied from the aforesaid image signal processing unit 303 and the frame signal applied from the frame signal generating unit 307 of the stroboscopically illuminated range. As a result, a synthesized image which is synthesized out of an original image and an frame image is displayed on the LCD panel 309.

Hereinafter are described arithmetic procedures performed by aforesaid frame position arithmetic unit 306 of stroboscopically illuminated range.

In FIG. 6, a size of the image focused on the surface of the image sensor is designated by an alphabetic character y, a range capable of being sensed the image on a planarized surface of the subject is designated by Y, an angle of view corresponding to y and Y is designated by THETA, a distance from the lens to the surface of the subject is designated by F and a distance from the lens to the surface of the image sensor, namely the focal distance, is designated by f.

Aforesaid angle of view THETA is obtained by the following equation:

$$\text{THETA} = 2 * \tan^{-1}(y/(2*f)) \quad (1)$$

On the other hand, aforesaid angle of view THETA is obtained by Equation (2) similarly to Equation (1).

$$\text{THETA} = 2 * \tan^{-1}(Y/(2*F)) \quad (2)$$

Substituting Equation (2) into Equation (1) gives the subsequent equation.

$$y/(2*f) = Y/(2*F) \quad (3)$$

Accordingly, the image sensible range Y is obtained by the following equation if the focal distance is denoted by f:

$$Y = (F/f) * y \quad (4)$$

In FIG. 7, focal distances f1 and f2 defined on a path on which the lens is driven during zooming are assumed that f1 is shorter than f2. If it is further assumed that both lens are located artificially on the same distance F from the subject and there is no variation in image size y sensed on the surface of the image sensing device caused by that assumption, image sensing-capable ranges Y1 and Y2 of which focal distances are respectively f1 and f2 are designated by Equations (5) and (6) corresponding to Equation (4).

$$Y1 = (F/f1) * y \quad (5)$$

$$Y2 = (F/f2) * y \quad (6)$$

From those equations, a relationship between Y1 and Y2 is represented by the following equation:

$$Y1/Y2 = f2/f1 \quad (7)$$

Consequently, a ratio between the image sensing-capable ranges can be obtained by an inverted ratio of the focal distances. Namely, in the frame position arithmetic unit 306 of the stroboscopically illuminated range shown in FIG. 5, the range that the zoom stroboscope unit 311 can illuminate can be computed from the focal distance of the zoom lens 301 and from the focal distance of the zoom stroboscope unit 311, the latter of which is identical with the illuminating angle of the zoom stroboscopic lamp, by a use of Equation (7).

When it is defined that f1=28 mm and f2=50 mm in FIG. 7, the image sensible range Y corresponding to f2 is Y2, of which image displayed on the LCD panel turns into that shown in FIG. 8(*a*). Because the illuminating angle, namely the focal distance, of the zoom stroboscopic lamp is controlled in response to the focal distance of the zoom lens 301, a whole image field can be illuminated herein and the illumination-capable range turns also identical with Y2. The same situation takes place so long as the focal distance f of the zoom lens 301 stays between 50 mm and 105 mm.

If the focal distance of the zoom lens 301 is f1, the image sensing-capable range is Y1 and the image displayed on the LCD panel therein turns into that shown in FIG. 8(*b*). Because the smallest value among the illuminating angles, namely the shortest focal distance, of the zoom stroboscope unit 311 is 50 mm, the stroboscopic illumination-capable range in the image field stays as Y2, which is herein defined as a frame $W_s$ enclosing the stroboscopically illuminated range. If the focal distance f of the zoom lens 301 is less than 50 mm, the same situation as mentioned above takes place. Herein a relationship between Y1 and Y2 is represented by the following equation:

$$Y1/Y2 = f2/f1 = 50/28 \quad (8)$$

When a vertical dimension and a horizontal dimension of the image field shown in FIGS. 8(*a*) and 8(*b*) are respectively defined as V and H, a vertical dimension $V_s$ and a horizontal dimension $H_s$ of the frame $W_s$ enclosing aforesaid stroboscopically illuminated range are respectively obtained from the following equations:

$$V_s = V*(28/50) \quad (9)$$

$$H_s = H*(28/50) \quad (10)$$

Actually, the frame position arithmetic unit 306 of the stroboscopically illuminated range shown in FIG. 5 has preliminarily retained numerical values for generating a frame having V×H in size. From those numerical values, the arithmetic unit 306 computes arithmetically $V_s$ and $H_s$. During that, a center of the frame is fixed. The signal generating unit 307 of the frame enclosing the stroboscopically illuminated range generates the frame signal from the frame position obtained by aforesaid computed result. As a results, the frame $W_s$ enclosing the stroboscopically illuminated range which is the frame for indicating the range that the zoom stroboscope unit 311 can illuminate is displayed together with the sensed image onto the LCD panel 309 as shown in FIG. 8(b).

On that occasion, system control unit 310 controls the frame signal generating unit 307 of the stroboscopically illuminated range not so as to generate the frame signal if the focal distance of the zoom lens 304 is identical with the focal distance of the zoom stroboscopic lamp 311.

As mentioned above, the apparatuses according to the present invention have the following effects:

(1) Because the flashlight illumination emitted from the flashlight device is terminated synchronously with the vertical synchronous signal, the flashlight device turns easily employable even when the high-speed shutter is used.

(2) Synchronizing the initiation of dischaging the flashlight illumination emitted from the flashlight device with the initiation of accumulating the carriers in the image sensing device makes the controllability in luminous quantity of light emitted from the flashlight device precise, which can provide the adequate exposure.

(3) Controlling the flashlight emission period synchronously with the accumulation period of the carriers in the image sensing device makes the controllability of the luminous quantity emitted from the flashlight device precise, which can provide the adequate exposure.

(4) Limiting the flashlight discharging period of the flashlight device within the accumulation period of the image sensing device to obtain a certain desired period for exposure makes the controllability of the luminous quantity emitted from the flashlight device precise, which can provide the adequate exposure.

(5) Because the frame for indicating the range that the flashlight emitted from the flashlight device can illuminate is displayed superimposingly on the image which is displayed simultaneously in a finder for confirming the image of the subject to be sensed, one who senses the image can easily understand to what extent the range that the flashlight illuminates expands in the image field to be sensed so long as he is watching the image displayed in the finder even if he does not grasp the focal distance, namely the image sensing-capable range, of the equipped lens and the focal distance, namely the illumination-capable range, of aforesaid flashlight device. This fact makes him easily conscious of the undesirable phenomena that the peripheries of the subject turn dark during sensing the image because the flashlight device cannot illuminate the whole area of the image sensing field due to the difference in focal distances between the lens and the flashlight device. As a result, the fact mentioned above realizes an excellent image sensing technology employing the stroboscopic flashlight device.

What is claimed is:

1. An image sensing apparatus employing a flashlight device, comprising:

a flashlight control circuit which initiates a flashlight illumination emitted from said flashlight device and terminates said flashlight illumination emitted from said flashlight device; and a detecting circuit which detects vertical synchronous signals out of an image signal, wherein said flashlight control circuit initiates said flashlight illumination in response to a vertical synchronous signal detected by said detecting circuit and terminates said flashlight illumination in response to a next vertical synchronous signal detected by said detecting circuit.

2. The image sensing apparatus according to claim 1, further comprising:

a counter for operating a counting operation synchronously with said vertical synchronous signal detected by said detecting circuit, wherein said flashlight control circuit initiates said flashlight illumination when a value counted by said counter amounts to a specified value.

3. The image sensing apparatus
according to claim 1, wherein said flashlight device is a flat light emission device which can afford continuously a constant luminous quantity.

4. An image sensing method performed by an image sensing apparatus which comprises a flashlight device, a flashlight control circuit, and a detecting circuit, comprising:

initiating a flashlight illumination emitted from said flashlight device by said flashlight control circuit;

terminating said flashlight illumination emitted from said flashlight device by said flashlight control circuit; and detecting a vertical synchronous signal out of an image signal by said detecting circuit, wherein:

said initiating is in response to a vertical synchronous signal detected by said detecting circuit; and said terminating is in response to a next vertical synchronous signal detected by said detecting circuit.

* * * * *